July 4, 1939.  J. Z. KORNBLATT  2,164,714
BEER DISPENSING APPARATUS
Filed Aug. 12, 1937  2 Sheets-Sheet 1
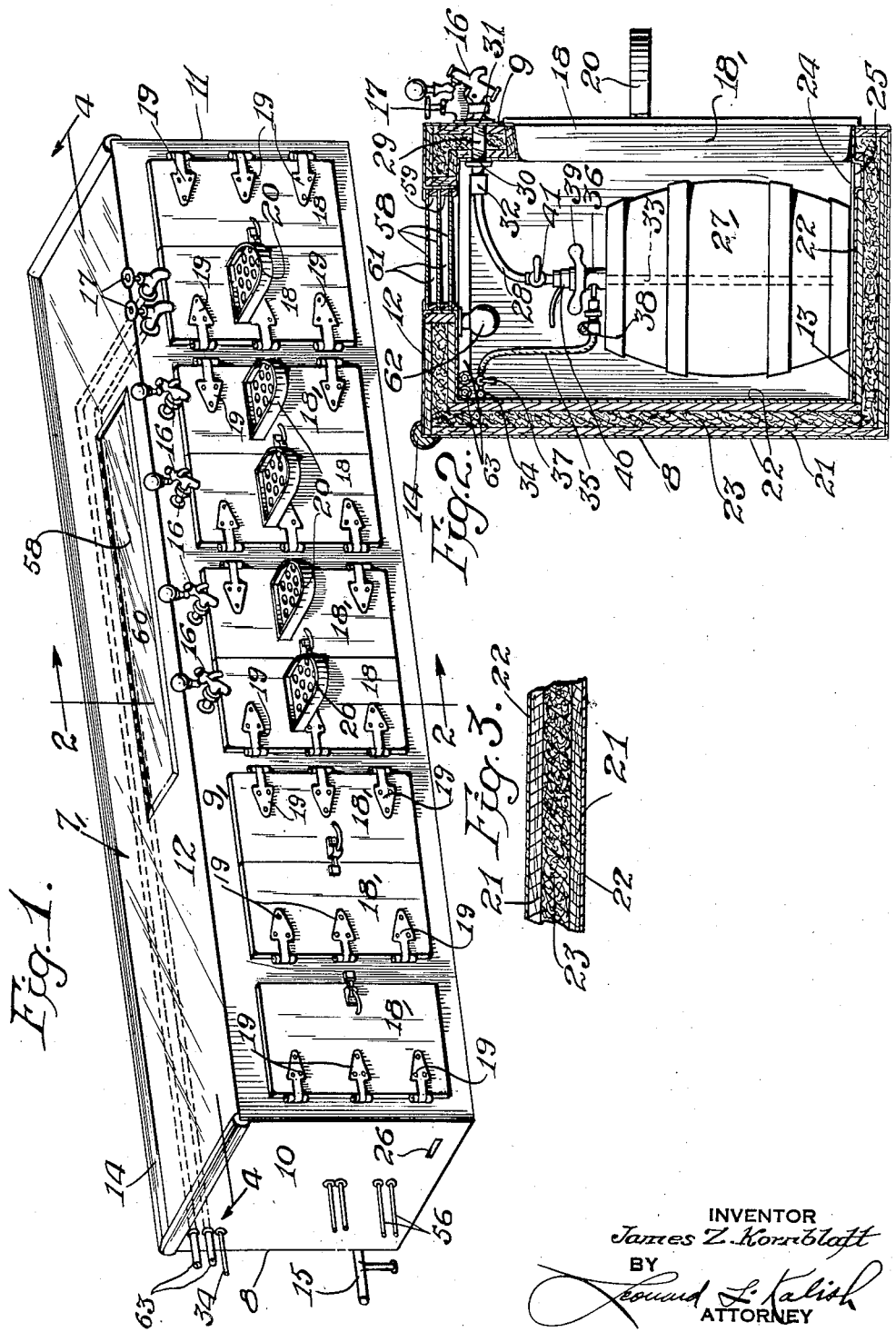
INVENTOR
James Z. Kornblatt
BY
Leonard L. Kalish
ATTORNEY July 4, 1939.  J. Z. KORNBLATT  2,164,714
BEER DISPENSING APPARATUS
Filed Aug. 12, 1937  2 Sheets-Sheet 2
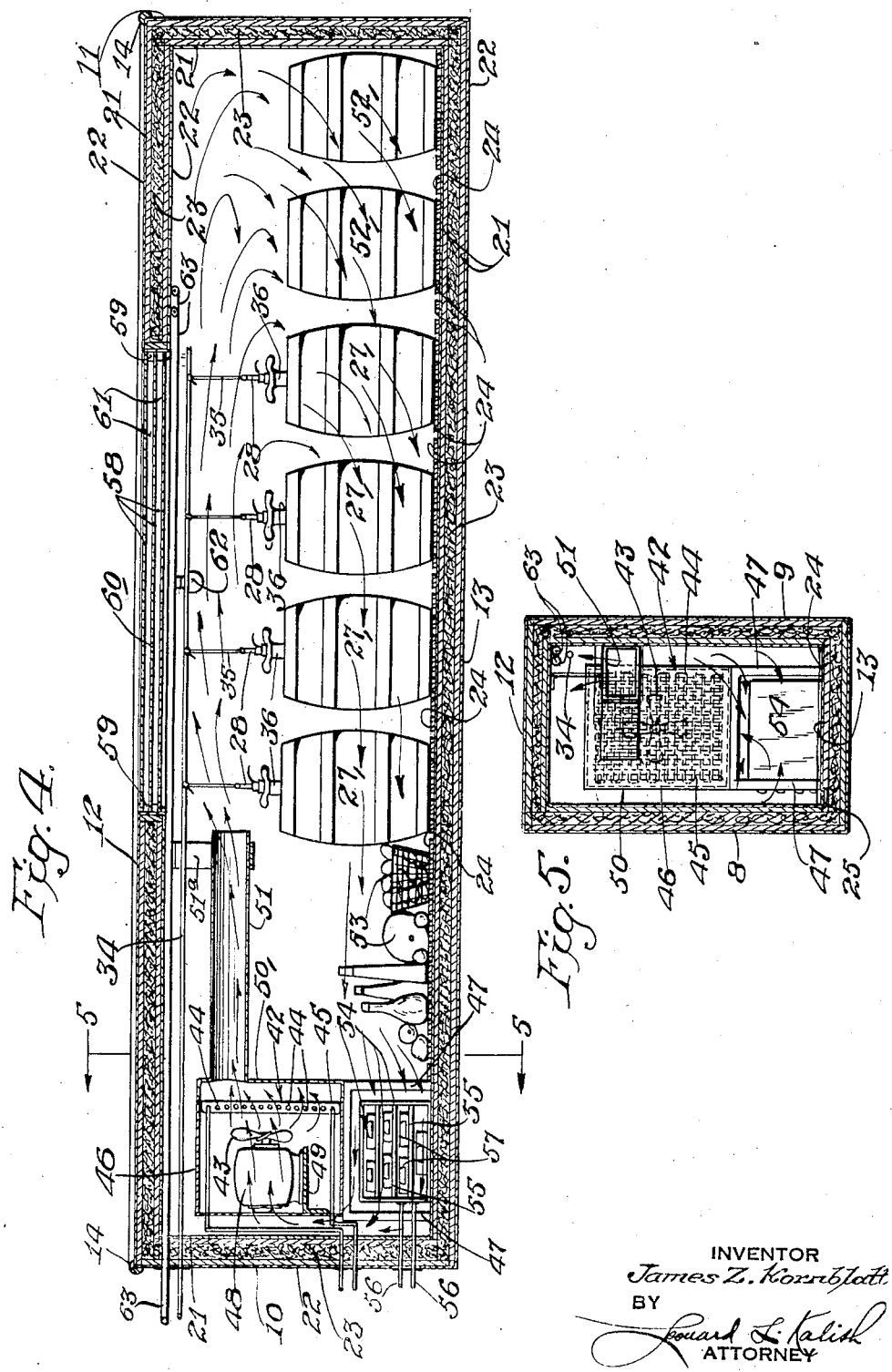
INVENTOR
James Z. Kornblatt
BY
Leonard L. Kalish
ATTORNEY Patented July 4, 1939

2,164,714

UNITED STATES PATENT OFFICE 2,164,714

BEER DISPENSING APPARATUS

James Z. Kornblatt, Philadelphia, Pa.

Application August 12, 1937, Serial No. 158,628

2 Claims. (Cl. 225—1)

The present invention relates to beer dispensing apparatus and it relates more particularly to apparatus for refrigerating and dispensing beer.

An object of the present invention is to provide means for refrigerating the air within a beer dispensing apparatus and for uniformly distributing said refrigerated air around and about the beer-kegs and beer conduits within said beer dispensing apparatus, whereby the beer may be maintained at a generally low and constant temperature at all points throughout its path of travel within said dispensing apparatus and up to the very point of departure from said apparatus.

Other objects will appear from the following detailed description, accompanying drawings, and appended claims.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in which like reference characters indicate like parts.

Figure 1 represents a perspective view of a beer-refrigerating and dispensing bar constituting one embodiment of the present invention, as it appears from the rear or bar tender's side thereof.

Figure 2 represents a transverse sectional view taken on line 2—2 of Figure 1, looking in the direction of the arrows.

Figure 3 represents an enlarged fragmentary sectional view of the thermally insulated bar wall, showing the insulation details thereof.

Figure 4 represents a longitudinal sectional view taken on line 4—4 of Figure 1, looking in the direction of the arrows, and showing the internal features of said bar.

Figure 5 represents a sectional view taken on line 5—5 of Figure 4 looking in the direction of the arrows.

In the particular embodiment of the present invention herein shown for the purpose of illustration or exemplification, the beer refrigerating and dispensing apparatus consists of a rectangular flat-topped bar-cabinet 7, having front and rear walls 8 and 9, end walls 10 and 11, and top and bottom walls 12 and 13. The edges of the upper surface of the top wall 12 may be provided with the customary bar-nosing 14, and a front rail 15 may be positioned in front and at the bottom of the front wall 8. Dispensing faucets 16, 16 and 17, 17 preferably project exteriorly of said bar a minimum distance therefrom, for reasons which will be more fully discussed hereinbelow.

Access may be had to the interior of the bar-cabinet 7 through the series of vertically hinged doors 18, 18 pivotally related to the rear wall 9 of said bar-cabinet through the hinges 19, 19. Removable drip-trays 20, 20 are preferably detachably mounted on the exterior of said access doors 18, 18 and directly beneath the dispensing faucets 16, 16 and 17, 17 and serve to collect liquid drippings and overflows.

The walls of the bar-cabinet 7 are thermally insulated against the passage of heat therethrough, and preferably consist of inner and outer spaced wood sheathing layers 21, 21 which are externally covered with thin corrosion-proof sheet metal layers 22, 22 and are separated from each other by a relatively substantial layer of any suitable insulating material 23, such as rock wool, spun glass, or the like.

The floor wall 13 of the bar-cabinet 7 is preferably lined with a series of spaced tranverse metal strips 24, 24 on which the kegs of beer may rest, and these metal strips provide means for draining off any moisture that may accumulate. A longitudinal drain-trough 25, provided on one side of the cabinet floor 13, serves to conduct such moisture to the exterior through the drain opening 26 provided in the bar-cabinet end wall 10, and in this fashion the accumulation of moisture within the interior of the bar-cabinet 7 may be effectively prevented.

The original beer-kegs 27, 27 are preferably longitudinally disposed within the interior of said bar cabinet 7 in spaced relationship, and may be operatively connected to their respective dispensing faucets 16, 16 by suitable flexible beer-conduits 28, 28.

As is more particularly illustrated in Figure 2, the beer dispensing faucets 16, 16 may be operatively secured to the rear wall 9 of the dispensing cabinet by means of a faucet-sleeve 29 which extends completely through said rear wall 9, and a screw-threaded nut 30 operatively associated with the end of said sleeve 29. The rear wall 9 may thus be securely clamped between the external shoulder 31 of the faucet 16 and said screw-threaded nut 30.

One end of the flexible beer conduit 28 is preferably coupled to the end of the sleeve 29 by means of the coupling 32. The opposite end of the conduit 28 may be coupled to the upper end of a rigid metal tube 33, which serves to conduct the beer away from the keg in response to air pressure exerted upon the surface of the beer. Thus, compressed air from an external supply source may be fed to the interior of the kegs 27, 27 through the air hose 34, the branch air hoses 35, 35 and the keg-tapping mechanism indicated generally by the numeral 36. The branch air hoses 35, 35 are preferably each provided with a shut-off valve 37, by means of which the compressed air supply can be shut off as desired, as for instance when changing kegs or the like. Each of these air hoses 35, 35 may be operatively connected to the interior of a beer keg 27 by coupling the discharge end of the hose 35 to the keg-tapping mechanism 36 by means of a band-coupling 38 and associated bolt and nut, or by any other suitable means. The keg-tapping mechanism 36 in turn conducts the compressed air to the interior of the keg 27.

In operation, the keg of beer 27 may be placed on end with the bung uppermost, and the keg-tapping mechanism 36 then may be screw-threadedly connected with the uppermost keg end by manually inserting the mechanism 36 into the partly exposed bung hole and then rotating the handle extremities 39, 39. This serves to secure the keg-tapping mechanism 36 coaxially relative to the bung, and the metal tube 33 then may be partially inserted downwardly through the positioned guiding mechanism 36 and the bung forced into the interior of the keg 27 by the application of several blows on the upper end of the metal tube 33. This permits the tube 33 to be fully extended downwardly within the keg 27, and the handle 40 then may be turned to seal the joint between the upper end of the tube 33 and the positioned guiding mechanism 36, and thus prevent the escape of compressed air therebetween. The free end of the flexible beer-conduit 28 may then be coupled to the upper end of the tube 33 and the valve 41 opened. If compressed air be now fed into the space above the beer in the keg 27 by opening valve 37, beer will flow through conduit 28 whenever the dispensing faucet 16 is opened. When the keg 27 is practically empty, the compressed air in the interior of the keg tends to escape to the atmosphere through the beer conduit 28 and the dispensing faucet 16. This escape may be checked, when noted, by first closing the valve 41 and then closing valve 37.

These valves may then be reopened when the empty beer keg has been replaced with a full one.

The interior of the bar-cabinet 7 is preferably refrigerated by means of an arrangement consisting of an air-refrigerating coil unit indicated generally in Figures 4 and 5 by the numeral 42, and an air-circulating fan 43 mounted in close proximity to said coil, for blowing air therethrough.

The air-refrigerating coil may consist of a single length of tubing bent to form spaced parallel horizontal branches 44, 44 through which the refrigerant gas may flow, and these branches may be structurally interconnected by means of the parallel vertical fins 45, 45. The air-refrigerating coil unit 42 may be mounted within a suitable housing 46, supported at any desired height above the interior floor of the bar-cabinet 7 by the legs 47, 47.

The air-circulating fan 43 is preferably directly driven by an electric motor 48 mounted on a shelf 49 disposed within said housing 46. A hood 50 may be positioned in front of and encompass the air-refrigerating coil unit 42 in order to guide the air forced through said coil into the sheet metal duct 51. The refrigerated air thus guided into the duct 51 may be then discharged within the interior of the bar cabinet 7 at a point removed from the refrigerating coil unit 42 and preferably in operative proximity to the kegs 27. The discharge end of the duct 51 may be hung from the bar-cabinet ceiling by the strap 51a.

The hood 50 and its associated sheet metal duct 51 cooperate with the air-refrigerating coil unit 42 and the circulating fan 43 in such fashion as to maintain substantially all portions of the interior of the serving-bar cabinet 7 at a generally uniform minimum low temperature, and this is particularly true with respect to the beer in the kegs and the conduits leading therefrom, which are disposed in the vicinity of the discharge end of the duct 51.

As indicated in Figure 4 by the multiplicity of arrows, the refrigerated air traverses the entire length of the bar-cabinet 7, encountering and cooling all the beer-kegs placed in said bar and is then deflected by the end cabinet-wall 11 and returns to the intake side of the fan 43, from which point it is again propelled through the lattice-work of the coil unit 42, where it is again refrigerated, and discharged from the duct 51. The refrigerated air discharged from the duct 51 completely surrounds the beer kegs 27, 27, the beer-conduits 28, 28, and each and every portion of the path taken by the beer during the dispensing thereof (with the sole exception of the sleeves 29 extending through the cabinet wall 9, and the short length of internal conduit disposed within the dispensing faucets 16, 16 which project beyond the exterior of the rear cabinet wall 9). In this fashion, the beer may be refrigerated at all points along its travel, from and including its supply source, up to the very point of discharge to the atmosphere, by a constant flow of refrigerated air, and variations in beer temperatures may be completely eliminated.

Additional untapped kegs 52, 52 (only two of which are shown in Figure 4) may be stored within the bar-cabinet 7 and preliminarily refrigerated, so as to be immediately available to replace kegs 27, 27 when emptied. In this way, no time need be lost in lowering the temperature of a fresh keg of beer to that best suited for dispensing purposes, and moreover, the beer may be kept refrigerated at all times, thus preserving its full flavor.

If desired, food articles 53 also may be stored within the refrigerator bar-cabinet 7.

Ice cubes may be conveniently formed with an ice making unit 54 which is preferably disposed beneath the main air-refrigerating unit. This ice-making unit 54 may consist of a series of hollow metal shelves 55, 55 within which may be disposed the parallel horizontal branches 56, 56 of an independent freezing coil. This freezing coil is separate and distinct from the air-refrigerating coil 42, but may be operatively connected to the same compressor and condenser to which this air-refrigerating coil unit 42 is connected. The ice-cube trays 57, 57 may be placed upon these shelves 55, 55 and readily removed when needed.

Carbonated and uncarbonated drinking water may also be refrigerated and dispensed from this same refrigerator bar-cabinet 7 by disposing sufficient lengths of water-bearing conduit 63, 63 within the interior of the refrigerated bar cabinet 7, and terminating these conduits at the water dispensing faucets 17, 17. The length of water conduit 63 exposed to the refrigerated interior of the bar cabinet 7 should be adequate to insure proper chilling of the water even under generally constant flow.

Three sheets of glass 58, held in spaced relationship relative to each other by means of peripheral strips of wood 59, may be interposed in a suitable aperture 60 in the top cabinet panel for the purpose of exposing the interior of the hereinabove described refrigerator bar-cabinet to the view of an observer. The gaps 61 between these glass sheets, which are preferably air-evacuated, assist the glass sheets in thermally insulating the aperture 60 against the passage of heat therethrough. The exhausting of the air prevents the formation of condensate on the glass surfaces 58, 58. Electric illuminating means 62 may be provided interiorly of the bar-cabinet in order to facilitate the observation of the cabinet interior.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention what is hereby claimed as new and desired to be secured by Letters Patent, is:

1. Beer-dispensing apparatus comprising a thermally insulated serving-bar cabinet, a beer-dispensing faucet mounted on said cabinet exteriorly thereof and having its inlet-end extending thereinto, said serving-bar cabinet having a chamber for receiving a beer-keg adapted to be operatively connected to said faucet inlet-end by a beer-conduit, means disposed within said cabinet for continuously refrigerating and circulating the air within said serving-bar cabinet including an air-refrigerating coil unit, an air-impeller disposed in operative proximity to said coil unit at one side thereof and arranged to circulate air therethrough, a hood associated with the opposite side of said coil unit, and an air-duct extending from said hood and discharging in the vicinity of said beer-keg, whereby the beer will be uniformly refrigerated at its source and along its path of travel by the continuous circulation of refrigerated air around and about said keg and conduit.

2. In a thermally insulated serving-bar cabinet having a chamber for receiving a keg of beer adapted to be operatively connected to a dispensing faucet mounted on said cabinet, an air-refrigerating coil unit transversely mounted within said chamber near one end thereof and in spaced relation to some of the walls thereof, an electrically driven fan operatively disposed immediately behind said air-refrigerating coil unit for driving the air in said chamber through the branches of said coil unit and in the general direction of said beer-keg, a hood operatively positioned against that side of said air-refrigerating coil unit facing said beer-keg, and an air-duct leading from said hood and discharging at a point substantially remote from said air-refrigerating coil unit and in the vicinity of said beer keg, whereby the beer in said serving-bar cabinet will be uniformly refrigerated by a forced draft of refrigerated air.

JAMES Z. KORNBLATT.